Aug. 29, 1933.　　　O. U. ZERK　　　1,924,587

SPRING SHACKLE MECHANISM

Filed April 12, 1932　　　5 Sheets-Sheet 1

Aug. 29, 1933.      O. U. ZERK      1,924,587
SPRING SHACKLE MECHANISM
Filed April 12, 1932      5 Sheets-Sheet 3

INVENTOR.
Oscar U. Zerk
BY
Sough + Canfield
ATTORNEYS

Aug. 29, 1933.　　　O. U. ZERK　　　1,924,587

SPRING SHACKLE MECHANISM

Filed April 12, 1932　　　5 Sheets-Sheet 4

INVENTOR.
Oscar U. Zerk
BY
Slough + Canfield
ATTORNEYS

Aug. 29, 1933.　　　O. U. ZERK　　　1,924,587

SPRING SHACKLE MECHANISM

Filed April 12, 1932　　　5 Sheets-Sheet 5

INVENTOR.
Oscar. U. Zerk
BY
ATTORNEYS

Patented Aug. 29, 1933

1,924,587

UNITED STATES PATENT OFFICE 1,924,587

SPRING SHACKLE MECHANISM

Oscar U. Zerk, Cleveland, Ohio

Application April 12, 1932. Serial No. 604,777

58 Claims. (Cl. 267—54)

This invention relates generally to bearings and hinges and relates particularly to the bearings of spring suspensions such as spring shackles, spring hangers and the like.

The spring shackles and hangers heretofore employed, for example, in automobile vehicles, have had relatively large bearing surfaces, which must be lubricated. To effectively lubricate such bearing surfaces there is required not only a relatively large quantity of lubricant, but also a frequent renewal of the lubricant. Such renewal is necessary because of the continuous abrasion of metal particles from both of the relatively large contacting bearing surfaces and the deterioration of the lubricant by the incorporation therein of such particles, and also because of the grit which is unavoidably carried or forced into the bearing and deposited on the bearing surfaces during the operation of renewing the lubricant.

Various means have been devised and proposed to flush out the old lubricant and thus to clean the bearing surfaces by the lubricant renewal operation among which are the present day high pressure lubricating systems, but these have only partly effected the result sought. When new lubricant is forced into a bearing some of the old lubricant may be forced out but practically all of it comes from those portions of the bearing surfaces other than those in pressure bearing contact. The old lubricant, in which is incorporated the metal particles worn from the bearing surfaces, grit etc. remains at the bearing surfaces which are in mutual contact pressure.

It is, therefore, an object of my invention to provide an improved bearing construction which will overcome the above described disadvantages of present constructions.

It is another object of my invention to provide such an improved bearing construction which may have particular application to spring shackles for automotive vehicles.

Another object is to provide a knife edge bearing construction for shackles or hangers which need not be lubricated throughout the entire life of the vehicle, or if lubricated at the time of installation on the vehicle need not have the lubricant renewed therein during the life of the vehicle.

Another object is to provide, in a bearing construction of the spring shackle type, improved resiliently operated packing means to prevent the ingress of dust and grit to the bearing surfaces.

Another object is to provide a spring shackle construction wherein the hanger elements of the shackle may engage the bearing elements on portions of the bearing elements of circular cross-section whereby an annular packing between the elements may be advantageously employed, to seal the bearing surfaces from the dust laden outer air.

Another object is to provide a bearing construction of the knife edge type adaptable for use in spring shackles wherein the knife edge portions of the bearing may be maintained in normal rocking engagement with each other even if the axes of the shackle end of the hanger and/or spring eye are forced out of parallel relation to each other.

Another object is to provide, in a knife edge bearing construction, means for effecting a lateral rocking movement around an axis at an angle to the axis of the knife edge whereby to provide in the bearing a universal movement.

Another object is to provide, in a shackle bearing construction, having a bushing or bearing housing, means to prevent longitudinal or axial movement of the bushing or housing relative to the knife edge bearing element therein, whereby end thrust bearing of the bushing or of the spring eye enclosing the same may be prevented.

Another object is to provide, in a spring shackle bearing construction having packing or sealing means, improved means within the sealing means, for taking end thrust movements of the bearing parts.

Another object is to provide, in a spring shackle construction, means for taking end thrust in the bearing whereby the spring eye or hanger eye may be maintained in spaced relation to the link elements or hanger yoke elements to prevent friction therewith.

Another object is to provide, in a knife edge bearing construction in which the knife edge element is supported upon the inner wall of a bearing enclosing bushing, means permitting the knife edge element to rock on the wall of the bushing to cause it to make even line contact with its mating bearing element.

Another object is to provide, in a knife edge bearing of the type in which a knife edge element is supported on the inner wall of a bearing enclosing bushing, means whereby the knife edge element may be moved to a centralized or symmetrical position relative to its mating bearing element after having been moved from said position by an oscillation or extreme movement.

Another object is to provide a bearing construction of the knife edge type wherein an improved mode of operation is effected by a blunt or rounded edge of the knife edge element of the bearing.

Another object is to provide a spring shackle construction in which play or clearance may be maintained between the spring or spring eye or hanger eye and the shackle links.

Another object is to provide, in a knife edge bearing construction of the type in which a sector-form knife edge element rockingly oscillates upon a mating bearing element, an improved construction in which the line of rocking contact may be effected upon hardened insert portions of the two bearing elements.

Other objects of my invention and the invention itself will become more apparent to those skilled in the art to which my invention appertains by reference to the following description of certain embodiments of my invention which are illustrated in the accompanying drawings, wherein:

Fig. 7 is a view taken along the line 7 of Fig. 6;

Figure 1:
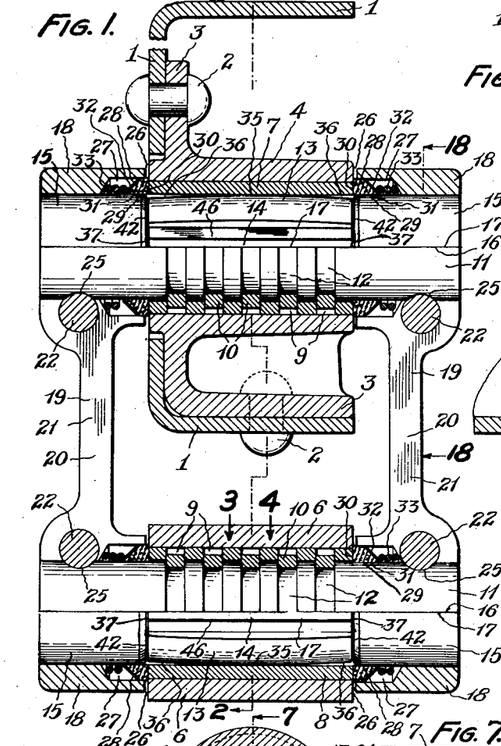
Fig. 1 is a cross-sectional view of a spring shackle construction embodying my invention, the shackle being one of which the hanger is located above the spring, and the view being taken approximately from a plane transversely of a motor vehicle.
Figure 2:
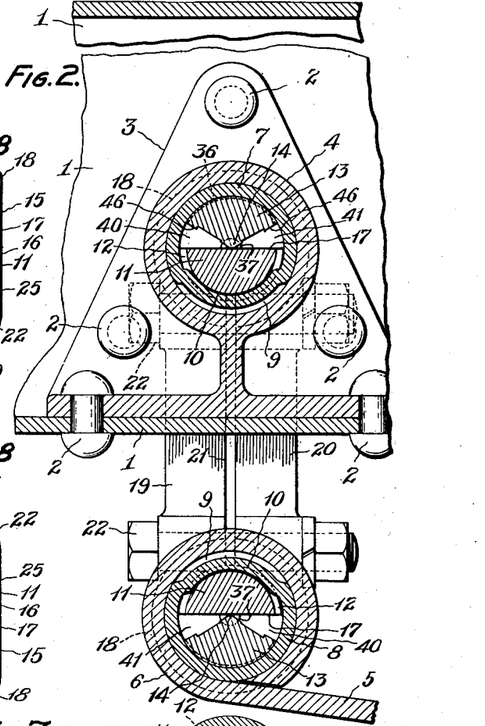
Fig. 2 is a sectional view of the shackle of Fig. 1 taken approximately along the line 2—2 of Fig. 1.

Referring to the drawings, Figs. 1 and 2, I have illustrated at 1 an automotive vehicle chassis channel to which is riveted by rivets 2—2 a shackle hanger 3 comprising a hollow tubular eye 4, the axis of which is disposed substantially horizontal. At 5, Fig. 2, I have illustrated a vehicle spring having a spring eye 6 of the usual hollow cylindrical form disposed at its axis horizontal and parallel to the axis of the eye 4, the eye 6 being spaced vertical below the eye 4.

In the shackle under consideration, the spring 5 is supported from below as by the vehicle axle and the elements of the shackle construction now to be described therefore are under compression.

Figures 3, 4, 5, 6, 8, 9:
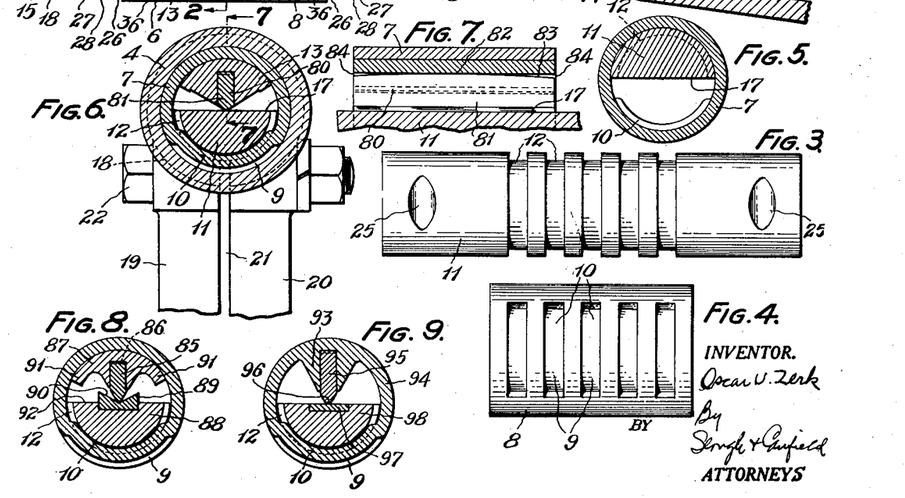
Fig. 3 is a view of a shackle bolt element which I may employ, and which is illustrated in Figs. 1 and 2, the bolt of Fig. 3 appearing as if viewed from the direction of the arrow 3 of Fig. 1.
Fig. 4 is a view of a bushing or bearing housing element which I may employ in association with the shackle bolt element of Fig. 3, the bushing of Fig. 4 appearing as if viewed in the direction of the arrow 4 of Fig. 1.
Fig. 5 is a fragmentary view of some of the elements of Fig. 2 with the elements in positions which they assume during an assembly operation thereof.
Fig. 6 is a fragmentary view similar to a part of Fig. 2 and illustrating a modification.
Figs. 8 and 9 are views similar to a part of Fig. 6 illustrating modifications.

The eyes 4 and 6 are fitted with internal bushings 7 and 8 respectively, the bushing 8 being illustrated separately in Fig. 4, and the bushings being identical except that the bushing 7 is disposed in the shackle in a different position. At spaced intervals lengthwise of the bushing its wall is pressed inwardly as at 9—9 to provide a longitudinal series of internal ribs 10—10 extending approximately one-third of the way around the inner wall of the bushing.

Through each of the bushings 7 and 8 is projected a bearing bolt element 11, the two elements 11 being preferably identical and one of which is shown separately in Fig. 3.

The bolt elements 11 are substantially of semi-cylindrical form and the portion intermediate the end thereof is provided with a longitudinal series of circumferential grooves 12—12 longitudinally spaced.

The bolt elements 11 are assembled in the bushing with the ribs 10 of the bushing intermeshed in the grooves 12 of the bolt element; and to effect this assembly, with respect to the upper bushing 7, the bolt element 11 is first disposed in the bushing 7 in the rotated position of Fig. 5 and then bolt element 11 is rotated through 180° by which operation the ribs 10 are brought into intermeshed relation with the grooves 12 of the element 11.

As will now be seen from the drawings, the bolt elements 11 occupy substantially one-half of the interior of the bushings 7 and 8. A knife edge bearing element 13 is placed within the bushings. The elements 13 are of sector-form in cross-section as shown in the drawings, and are disposed with the knife edge 14 thereof along the center line of the bolt element 11 and with the generally cylindrical opposite surface thereof disposed along the wall of the bushing.

Around the four cylindrical portions thus provided at the opposite ends of the bolt element 11, the eyes 18—18 have a pair of similar shackle links 19—19. The shackle links 19 thus comprise an eye portion 18—18 at opposite ends of a body portion 20, and the body portion 20 is longitudinally, that is vertically, split as at 21, the split extending into the interior of the eyes 18—18. Bolts 22—22 are projected through the links 19 in position to draw the portions of the links on opposite sides of the split 21 toward each other with a clamping action whereby the eyes 18—18 are constrictingly clamped upon the jointly cylindrical bolt element 11 and filler 15 to make a rigid structure comprising the two links and the two bolt elements 11.

The bolt elements 11 are provided with cylindrical grooves 25—25 in their outer cylindrical portions engaged by the bolts 25 whereby the bolt elements 11 are rocked against rotation and against axial movement in the eyes 18 of the links.

The eyes 18 extend axially inwardly toward the hanger eye 14 and spring 6 to a point adjacent to the axial end of the latter but are spaced therefrom as at 26—26 to provide at all times a clearance space.

In this connection it will be observed that the bolt element 11 by virtue of the engagement of its grooves 12 with the ribs 10 of the bushing is prevented from longitudinal movement relative to the bushing and therefore relative to the eye 4 or the eye 6; and the eyes 18 being rigidly connected to the bolt element 11 are prevented from axial movement relative to the eyes 4 and 6 to maintain the clearance 26 above referred to.

The inwardly directed confronting portions of the eyes 18—18 are provided with recesses 27—27 in which an annular ring 28 of packing material is disposed sealingly engaging the cylindrical surface of the joint cylinder 15—11 as at 29 and also sealingly engaging the planular ends of the bushings 7 and 8 as at 30.

To insure permanence of the seal and to effect the same with the desired pressure, the outer annular surface of the packing element 28 is beveled as at 31 to provide a frusto-conical surface 31 and a metal ring conforming to the frusto-conical surface is disposed thereon as at 32, and a compression spring 33 abuts at one end upon the bottom of the recess 27 and at the other end upon the ring 32 to thus compress the packing element 28 both inwardly radially and inwardly axially against the surfaces 29 and 30 above referred to.

In cross-sectional view as above described, the knife edge element 13 conforms generally, at portions opposite its knife edge 14, to the inner wall of the bushings 7 and 8. Preferably, however, longitudinally, as viewed in Fig. 1, the element 13 is slightly rounded from end to end where it engages the inner wall of the bushing; and thus with the parts in a normal position, the element 13 engages the inner wall of the bushing at a central point 35 and clears the wall of the bushing in a direction longitudinally therefrom, for example as at 36.

The inner confronting ends of opposite fillers 15—15 are disposed adjacent the corresponding ends of the knife edge element 13 and may axially abuttingly engage the ends thereof on semi-circular button-like elevated portions 37—37 concentric with the knife edge 14 of the knife edge elements 13.

The knife edge elements 13 are thus prevented from axial shifting and during relatively rocking movement of the elements 13 on the bolt element 11, to be more fully described, any friction between the button-like elements 13 and the knife edge element 13 will be a negligible amount.

In the operation of the shackle construction described above, load on the channel 2 is transmitted downwardly through the eye 4 to the bushing 7 and thence through the upper knife edge element 13 to the bolt element 11, thence through the shackle links 19—19 to the lower bolt element 11 and from it through the lower knife edge element 13 to the bushing 8 and thence to the spring eye 6.

Upon flexing of the spring 5, the spring eye 6 swings around the hanger eye 4 in the usual manner of shackles, and during this movement in the shackle above described, the bearing movement is a rocking movement of the knife edges 14 upon the planar faces 17 of the bolt elements 11. The frictional engagement of the knife edge elements 13 with their encircling bushings will maintain them normally in a symmetrical position with respect to the bolt elements 11.

Upon the occurrence of lateral thrust upon the shackle by lateral movements of the vehicle body, transmitted to the channel 1, the hanger eye 4 and spring eye 6 will tend to shift out of vertical alignment, and this would tend to unequalize the pressure engagement along the knife edge 14 of the element 14; but in the construction above described, comprising the longitudinally rounded form of the knife edge element 13 and the clearance provided thereby at 36—36, the knife edge element 13 will roll longitudinally in the bushings 7 and 8, and thus the equalized knife edge bearing pressure will be maintained and the entire shackle may rock on its knife edges uninfluenced by the side swing to which it is subjected.

Due to the fact that the bearing engagement of the parts of the structure move on each other with a rocking or rolling movement, lubricant in the bearings is not necessary, particularly when the essential parts are made of material such as hardened rustless or stainless carbon chromium steel. The use of such steel prevents any formation of rust and the consequent dust and grit which otherwise might impair dry bearing surfaces. And grit and other deleterious substances are prevented from having access to the knife edge bearing elements by the sealing packing 28.

However, if desired lubricant may be employed, such for example, as high viscosity oil or grease made with high viscosity oil, and such lubricant may be packed into the chamber formed by the bushings 7 and 8.

When lubricant is employed, as will now be understood, it will fill the sector-shaped portions of the chamber, 40 and 41, on opposite sides of the knife edge 14, and will lubricate the engaged surfaces of the rib 10 and groove 12 above described, as well as the generally cylindrical surface of the knife edge element opposite the knife edge 14 engaging the inner wall of the bushing, and the ends of the knife edge elements 13 where they engage the button-like elevations 37. Thus all parts of the bearing construction may be reached by lubricant packed in the bushing chamber.

When lubricant is employed, any relatively violent swing of the shackle such as will substantially close up the chamber portion 40, for example, will compress the lubricant in that chamber portion. By providing the button elevations 37—37, there is correspondingly provided a clearance space 42 between the ends of the knife edge elements 13 and the inner ends of the fillers 15, and lubricant compressed in one chamber portion such as the chamber portion 40 may flow through the clearance spaces 42—42 into the other chamber portions, such as the portion 41.

Thus the lubricant may flow from point to point within the chamber to equalize the pressure thereof and will be at all times sealed within the chamber to keep it uncontaminated from external grit etc. by the packing 28 above described.

Figures 10, 11, 12, 13, 14, 15:
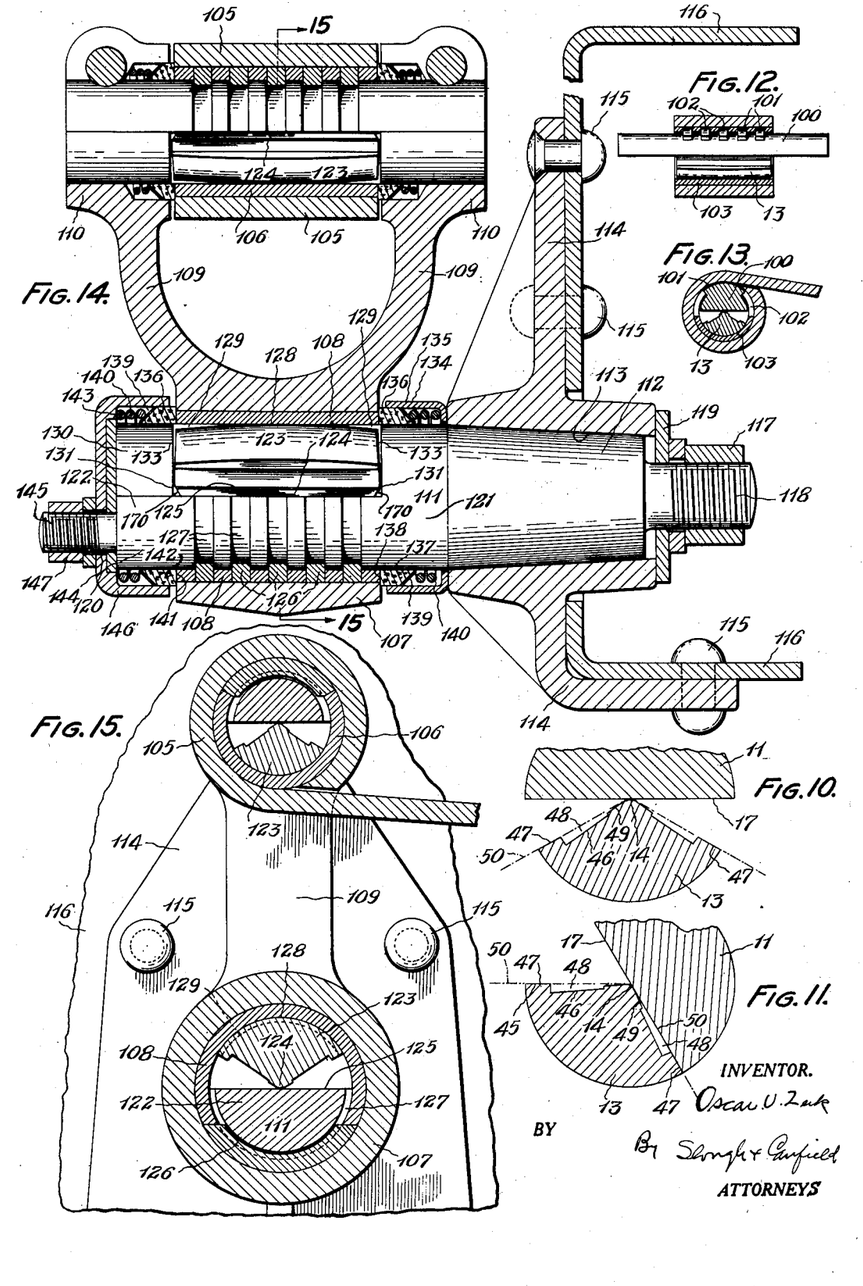
Figs. 10 and 11 are diagrammatic views illustrating certain features of construction and the mode of operation thereof, of a pair of knife edge bearing elements which I may employ.
Figs. 12 and 13 are fragmentary views illustrating a modification of bushing and bearing elements shown in Figs. 1 and 2.
Fig. 14 is a view generally similar to Fig. 1 but illustrating my invention as embodied in another type of shackle.
Fig. 15 is a sectional view taken along the line 15—15 of Fig. 14.

The knife edge element 13, as described above, is not rigidly secured to the inner wall of the bushing 7 or 8 in which it is disposed, but is free to rotate around on the inner wall of the bushing. Therefore, upon a very violent swing of the shackle construction, the planar face 17 of the bolt element 11 may rotate on the knife edge 14 sufficiently far to bring it into engagement with the knife edge element 13. In Fig. 10 is illustrated the normal position of the elements 11 and 13, and in Fig. 11 their relative positions resulting from a violent swing of the shackle; and as shown in Fig. 11, the knife edge element 13 is brought into axial contact with the element 11 at 45, and the force of the impact may be sufficient to rotate the element 13 out of its normal position, thus avoiding injury to the bearing which might result if the element 13 were rigidly supported.

The lateral sides of the knife edge element 13, shown generally at 46—46, are formed so that upon impact of these sides with the surface 17 of the bolt element 11, the impact will occur on the element 13 at portions remote from the knife edge 14. The form referred to is clearly illustrated in Figs. 10 and 11.

As shown in these figures, the lateral sides 46 comprise a radial portion 47 remote from knife edge 14, an intermediate recess portion 48, and a portion 49 adjacent the knife edge 14 lying within a radius 50 along which the portion 47 lies. Thus, upon impact with the surface 17, the radial portion 47 will engage the surface, and the portion 49 will be out of engagement therewith, except at the knife edge 14; and furthermore, the recess portion 48 will provide an escape passageway for lubricant between the surface 17 and the surface generally at 46; and it will be understood from the above description, lubricant in the passageway 48 may flow longitudinally of the knife edge element 13, to the clearance spaces 42 at the ends of the element and thence into the chamber portion on the other side of the knife edge.

The knife edge 14 may be a relatively sharp edge, but I prefer to provide an edge 14 which is relatively rounded. One advantage of a rounded edge is that as the knife edge element 13 moves with its relative rocking movement on the bolt element 11, the actual line of contact on the element 11 will shift and be in the nature of a rolling movement whereby the contact surface may be continuously lubricated.

Again, it will be observed, as described above, that the surface of the knife edge element opposite the knife edge conforms generally to the inner cylindrical surface of the bushing in which it is disposed, and therefore, during the relative rocking movement of the knife edge element, it tends to remain coaxial with the bushing; thus, for rocking movement beyond a certain minimum amount, the round knife edge will have a sliding movement on the surface 17 of the element 11, small in amount but sufficient to assist in lubricating the rounded edge. Such sliding movement will occur principally concurrent with relatively violent swings of the shackle.

Again, by employing a rounded edge, the knife edge element 13 constantly tends to return to the symmetrical position of Fig. 10. This may be understood by referring to Fig. 11. In that figure the knife edge element 13 is illustrated as having been displaced from its symmetrical position by a relatively violent swing of the shackle and by impact of the surface 17 of the element 11 upon the radial portion 47 of the element 13. When the element 11 relatively returns to the normal position in which the surface 17 is horizontal in Fig. 11, then due to the rounded knife edge 14, surface 17 will engage the element 13 on a portion of the rounded edge which is toward the left of the vertical center line, in Fig. 11. Thereafter the pressure of the surface 17 on the element 13 tends to produce a counter-clockwise torque or couple on the element 13 and, since the element 13 is free to rotate in its bushing around its center, the element 13 will gradually drift counter-clockwise to take up ultimately its symmetrical position of Fig. 10.

Figure 19:
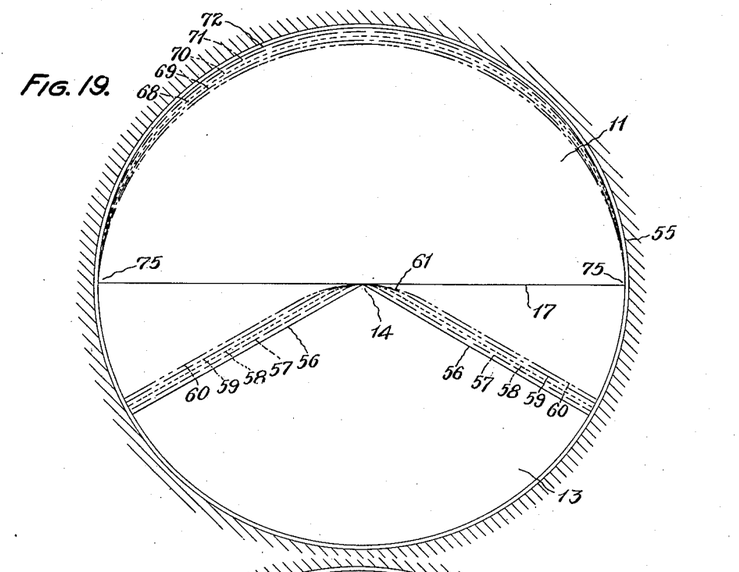
Fig. 19 is a diagrammatic view illustrating a feature of the mode of operation of a mutually engaged pair of knife edge bearing elements which I may employ.
Figure 20:
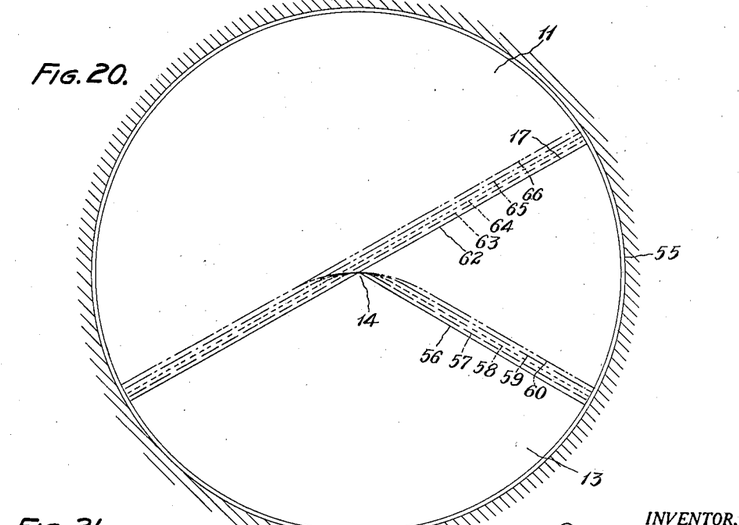
Fig. 20 is a view similar to Fig. 19 illustrating another feature.
Figure 21:
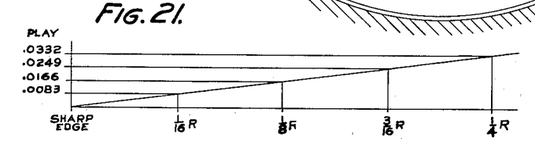
Fig. 21 is a graph illustrating certain relations between the radius of curvature of a blunt edge knife edge bearing element which I may employ and requisite clearance for the mating bearing element thereof.

In Figs. 19, 20, and 21, I have illustrated diagrammatically other effects resulting from the employment of a rounded knife edge 14. In Fig. 19, the circle 55 represents the inner wall of the bushing 8 of Figs. 1 and 2, and the bolt element 11 and knife edge element 13 are illustrated as disposed in the bushing. The lines 56—56 to 60—60 inclusive represent the lateral or side walls of the knife edge element 13, embracing therebetween the knife edge 14. For the lines 56—56, the knife edge 14 is a sharp edge. For the lines 60—60 the knife edge is a greatly rounded edge, as indicated at 61, which rounded curve merges into the lines 60—60. The knife edges for the lines 57–59 inclusive are edges 14 of intermediate degrees of curvature or radius.

In Fig. 20, the same parts as in Fig. 19 are illustrated, and in the figure the bolt element 11 is shown in an extreme rocked position. The planar surface of the element 11 is illustrated in different positions, 62–66 inclusive, these being the positions which the surface takes up when rocked to the extreme position on element 13, having different degrees of roundness of the edge 14. For example the surface 17 takes up the position 66 upon the same surface, is rocked around counter-clockwise with the element 11 and until the surface 66 becomes coincident with the lateral side 60 of the knife edge element 13.

Inasmuch as the element 11 is disposed within the inner wall 55 of its bushing, and inasmuch as the surface 17 moves radially away from the center of the bushing as it rocks around upon the rounded knife edge 14, it follows that for all knife edges except the sharp knife edge having the side wall 56—56, the cross-sectional shape of the element 11 must be less than a semi-circle, otherwise it would more than fill the inner wall of the bushing 55 at all positions except the position of Fig. 19.

Thus, where the rounded edge 14 is employed, clearance or play is provided on the generally cylindrical outer surface of the element 11. Such clearance is shown in Fig. 19. The line 68 represents the surface of the element 11 when the extremely rounded edge 14 determined by the lines 60—60 is used, and the curved line 72 represents the surface of the element 11 when the sharp edge 14 is employed, and the intermediate curves 69–71 inclusive represent the element 11 for knife edge elements having intermediate degrees of curvature. The space between any lines 68–72 inclusive and the inner wall 55 of the bushing is the clearance or play which may be provided.

In the graphic chart of Fig. 21, suitable play or clearance is illustrated corresponding to different degrees of roundness of the knife edge 14. For a perfectly sharp edge no clearance is needed. For an edge having generally a radius of $\frac{1}{16}$th of an inch, a play or clearance of .0083 should be provided. Correspondingly, for edges having a radius of ⅛th inch, ₁⁶th inch, ¼th inch, etc., corresponding clearances of .0166, and .0249, and .0332, etc. should be provided.

As just described in connection with Figs. 19 to 21, the generally cylindrical surface of the bolt element 11 may be formed to clear the cylindrical inner wall of the bushing by an amount variable in accordance with the degree of curvature of the knife edge 14; but it will be understood that the element 11 need not have clearance along the edges of the planular surface 17, for example at 75—75 in Fig. 19. Of course some clearance must be provided at these points to permit the element 11 to rotate in the bushing, and such clearance may be of the order of .003 inch, but no additional clearance need be provided at these points in view of a rounded knife edge 14 for the purposes above described.

Referring now to Fig. 20, I have reproduced the conditions resulting when the shackle performs a violent swing.

As illustrated, the bolt 11 is rotated counter clockwise through a considerable angle, and the planular surface 17 is presented to the edge 14 of the knife edge element at an inclination.

Under these conditions the downward load on the bushing 7, transmitted thereto from the eye 4, may cause the knife edge 14 to slide along the surface 17 whereupon the inner wall of the bushing will be brought into actual contact with the element 11 on the portion 75 whereat, as above stated, the normal clearance was of a nature of .003 of an inch. Relative rocking movement of the element 11 on the element 13 may tend to cause abrasion at the portion 75 on the bushing wall but such abrasion will be wholly negligible for the following reasons.

In the first place there will be no abrasion ordinarily because the ordinary swings of the shackle do not exceed 15°. It is only in rare cases that the swing of the shackle is more than this amount, and it is thus only in extraordinarily violent operation that there is any friction at all on the portion 75. The normal clearance of .003 of an inch is sufficient to insure that the wall of the bushing will at all times be lubricated, so that when contact between the bushing and the portion 75 does occur it will be upon lubricated surfaces. The bolt element 11 and the bushing are preferably made of hardened steel, and the actual pressure between the rubbing parts at the portion 75 is relatively small in any case, and is only momentary, occurring as it does only at extreme portions of occasional violent swings. Thus a wholly negligible amount of abraded material is ever produced by this action to contaminate any lubricant, applied to the bearing, or to abrade the bearing surfaces.

As will now be clear, from the foregoing description, I have provided a bearing construction particularly adaptable to shackles, and which may be operated without any lubrication whatever, or may be packed lubrication which will last throughout the entire life of the car without renewal. The central bearing elements are enclosed within a chamber sealed therein by packing elements resiliently maintained with pressure against the portions or surfaces which they seal. Upon relative rocking movement of one knife edge bearing element upon the other, the incompressible lubricant is free to shift or flow from one side of the chamber to the other to avoid hammer blows, and the like, which would otherwise occur.

The two knife edge bearing elements are automatically relatively adjustable whereby the knife edge portion of one may at all times have uniform pressure engagement with its mating rocking element, even when the bearing is subjected to severe lateral thrusts. End thrusts, that is to say, thrusts longitudinally of the knife edge bearing, are absorbed by bearing portions of negligible friction which may be thoroughly lubricated. The spring eye and the hanger eye of the shackle are at all times maintained out of contact with the shackle links, and the eyes at their ends.

A knife edge element is employed of such form and is supported in such a manner in a lubricant chamber that it may shift rotatively in the chamber upon the occurrence of violent swings of the shackle to avoid hammering of portions thereof in its mating bearing element, and is so designed that it will gradually return to its normal position. The bearing construction permits of the use of either a sharp knife edge or a rounded knife edge, and whatever edge is employed the construction insures that the actual rocking contact shall at all times be lubricated.

Referring now to a modification of my invention illustrated in Figs. 6 and 7, a construction generally similar to that of Figs. 1 and 2 is provided, but in this form the knife edge element shown generally at 13 has the knife edge 80 thereof formed upon a hard steel insert 81 mounted in a longitudinal groove in the element 13. The opposite sides of the insert are parallel proceeding generally away from the edge 80. The longitudinal edge of the insert remote from the knife edge 80 thereof is rounded longitudinally and thus makes pressure contact at an intermediate portion 82 with the bottom 83 of the groove and on portions remote from the point 82 in opposite directions has clearance with the bottom 83 as at 84—84. Thus the hardened element 81 may rock longitudinally in the knife edge element 13 for the self-adjusting purposes described more fully in connection with the longitudinally rounded knife edge element 13 of Figs. 1 and 2.

In the modification of Fig. 8 there is provided a knife edge element 87 having a hardened steel insert 85 therein longitudinally rounded as indicated at 86 similarly to the longitudinal rounding of the insert of Fig. 6.

Correspondingly, the bolt element 88 is provided with a hardened steel insert 89 having a V-shaped concave surface 90 at the apex of which the knife edge of the insert 85 is disposed. The knife edge 87 and the insert 85 are formed to embrace a more acute angle than the corresponding portions of the other forms to permit a substantial relative rocking movement without contact engagement of the insert 85 or element 87 with the concave surface 90, and the element 87 has wings 91—91 of substantial circumferential extent whereby the ends of the wings may engage the planar surface 92 of the bolt 88 with concurrent clearance between the concave surface 90 and the opposite portions of the knife edge element.

In the modification shown in Fig. 9, the knife edge element proper 93 is formed integral with the bushing 94, and the hardened insert 95 having a knife edge 96 engages the planar faced hardened insert 97 in the bolt element 98.

In the modification shown in Figs. 12 and 13, instead of the inwardly directed ribs 10, and grooves 12 meshed therewith of Figs. 1 to 9, I provide a bolt element 100 having outwardly extending ribs 101 which project into and mesh with corresponding slots 102 in the bushing 103. In the forms of Figs. 1 to 9, the ribs are male with respect to female grooves in the bolt element, whereas in the form of Figs. 12 and 13, the ribs are male with respect to the bolt element and engage female grooves in the bushing.

In the form of my invention shown in Figs. 14 and 15, the shackle is of the type which is under tension. A spring eye 105 has a bushing 106 therein, and a shackle eye 107 has a bushing 108 therein. The shackle links 109—109 have shackle eyes 110—110 on their upper ends and at their lower ends merge into the single shackle eye 107. The knife edge bearing construction associated with the eyes 110—110 may be similar to or identical with the construction shown in Figs. 1 and 2 in connection with the spring eye 18.

The bearing construction at the lower end of the shackle associated with the eye 107, includes a shackle bolt 111 having a conical portion 112 seated into a conical bore 113 of a shackle hanger 114, secured as by rivets 115 to a vehicle channel 116.

The bolt 111 may be rigidly drawn into the bore 113 by a nut 117 threaded on a shank 118 of the bolt, and a washer 119 spanning the end of the bore.

The bolt 111 is sufficiently large in diameter to transmit to the shackle the load on the channel 116. Outwardly of the hanger 114, the bolt 111 comprises a cylindrical portion 121 for a portion of its length, and thence to the outer end 120 of the bolt it is cut away leaving a semi-cylindrical portion 122. A knife edge element 123 has a knife edge 124 engaging the planar surface 125 of the semi-cylindrical portion 122.

The bushing 108 has interiorly directed ribs 126 meshed with circumferentially extending grooves 127 in the cylindrical outer surface of the bolt 122.

The knife edge element 124 is substantially of sector-shape in cross-section, and conforms generally to the inner cylindrical wall of the bushing 108, but may be longitudinally rounded so as actually to normally engage the wall of the bushing at a central point 128, and to clear the same at points remote therefrom as at 129—129.

A filler element 130 generally semi-cylindrical in cross-section extends from the outer longitudinal end of the knife edge element 123 to the end of the bolt element 122. The filler 130 and the outer end of the bolt 122, and the inner cylindrical portion 121 of the bolt thus constitute two cylindrical bolt portions adjacent the ends of the bushing 108.

The inner opposite confronting faces 131—131 of the cylindrical portion 121 and the filler 130 are preferably disposed in parallel transverse planes making actual contact with the ends of the knife edge element 123 only at points adjacent the knife edge, and to this end the ends of the element 123 are bevelled off adjacent the edge as at 170 and radially outwardly therefrom the end faces of the knife edge 121 are cut back to provide clearance passages 133—133.

A cup-like element 134 has a large perforation in the cup bottom telescoped over the cylindrical portion 121 of the bolt 111, and the skirt 135 thereof is telescoped over a packing element 136, annular in form and making an inner sealing engagement with the cylindrical surface of the portion 121 as at 137, and also a sealing engagement with the longitudinal end of the bushing 108 as at 138. A frusto-conical washer 139 engaging a corresponding formed portion of the packing ring 136 is pressed against the ring by a compression spring 140 abutting upon the washer and upon the cup bottom to resiliently maintain pressure seal at 137 and at 138.

A similar packing element 136, spring 140, washer 139, are provided at the opposite end of the bushing 108 and sealingly engages the same at 141, and also sealingly engage at 142 the cylindrical surface comprising the outer surface of the filler 130 and the bolt 122.

The spring 140 reacts against the bottom 143 of a cup-form element the skirt of which telescopically embraces the packing 136, and the bottom of which has a perforation 144 through which a shank portion 145 of the bolt element 122 projects. The cup-form element 146 is maintained in position upon the end of the bolt element 122 by a nut 147 on the threaded shank 145.

It is believed that the operation of the form of my invention of Figs. 14 and 15 will be clear from the detailed description of the preceding forms inasmuch as the elements of the construction are essentially the same, except for those differences which adapt bearing construction to the particular type of shackle of Figs. 14 and 15.

Figure 16:
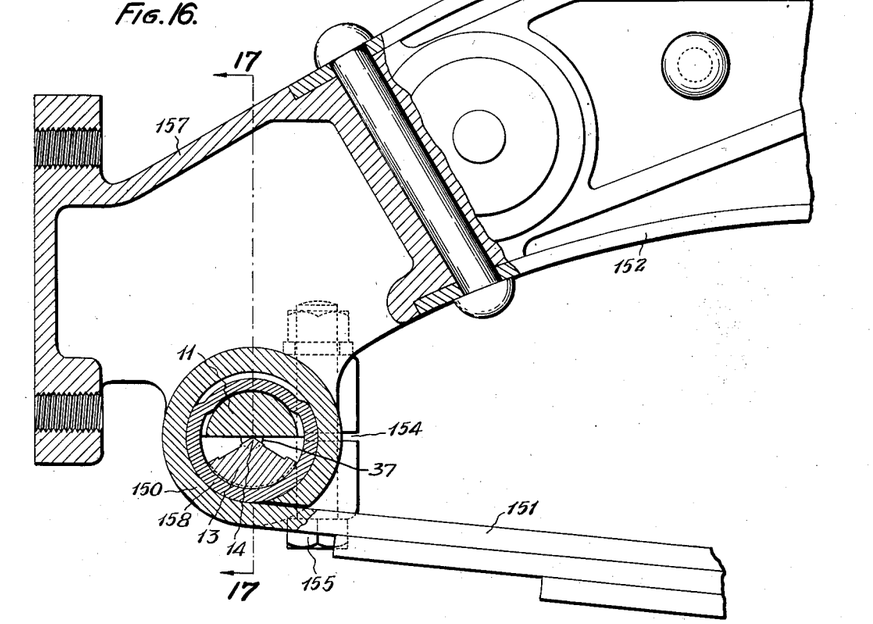
Fig. 16 is a view illustrating the application of my invention to the connection between a spring eye and a hanger, the view being taken on a plane longitudinal of the vehicle.
Figure 17:
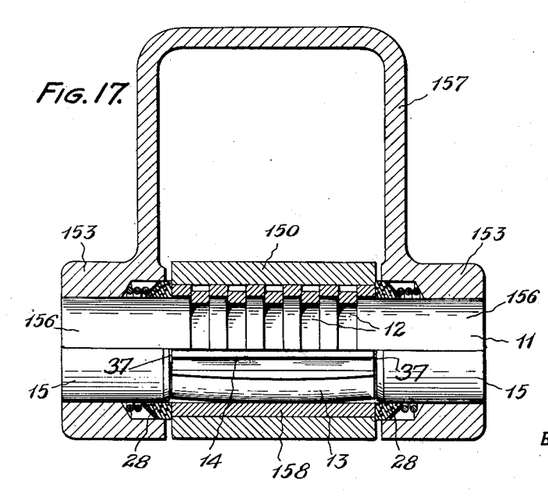
Fig. 17 is a view taken along the line 17 of Fig. 16.
Figure 18:
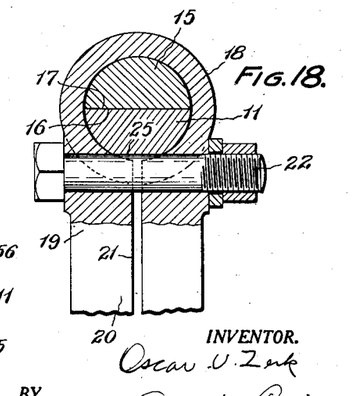
Fig. 18 is a fragmentary view taken along the line 18 of Fig. 1.

Referring to Figs. 16 and 17, I have illustrated the application of knife edge bearing of my invention to the type of spring suspension in which the eye 150 of the spring 151 is connected directly to a channel or sill element 152 of the automotive vehicle. The channel 152 has formed thereon coaxial, axially spaced eyes 153—153 longitudinally split as at 154 whereby bolts 155, disposed to draw the split 154 together, may spring the eyes 153 into constricting clamping engagement upon cylindrical portions formed semi-cylindrical ends 156—156 of bearing bolt element 11 and semi-cylindrical filler elements 15—15.

The spring eye 150 has telescopically inserted therein a bushing 158. The bushing 158, bolt element 11, and filler element 15—15, knife edge bearing element 13 and packing 28 may be the same or similar to those of Figs. 1 and 2, and it is believed that the operation of this form of my invention will be understood from the more complete description of the other forms.

Figures 22, 23:
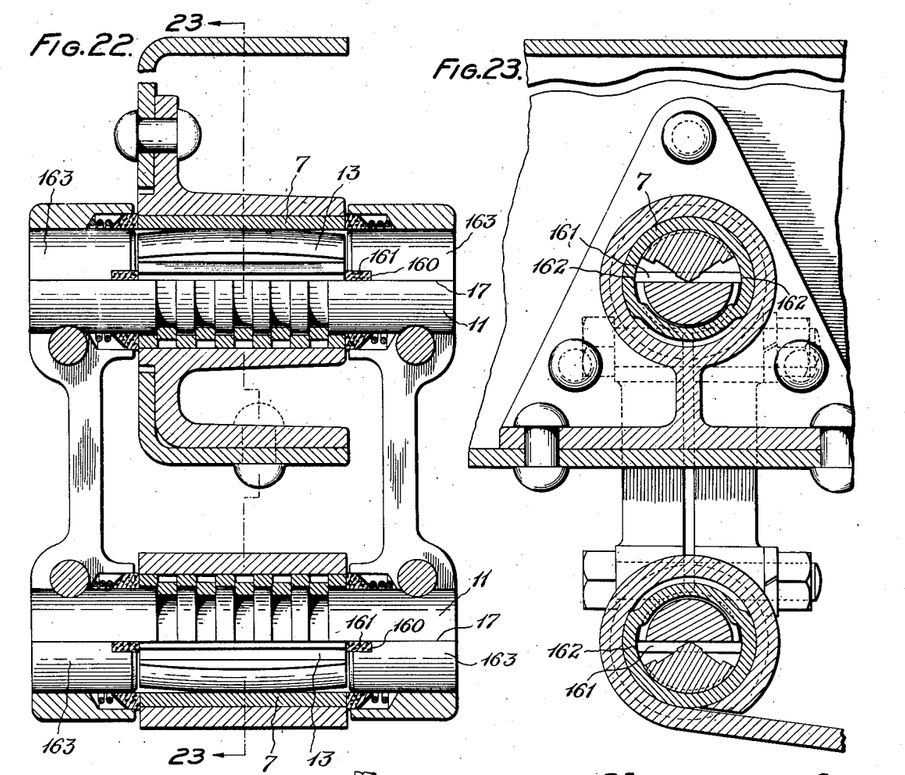
Fig. 22 is a view similar to Fig. 1 but illustrating a modification.
Fig. 23 is a view similar to Fig. 2 but illustrating a modification, the view being taken approximately along lines 23—23 of Fig. 22.

In Figs. 22 and 23 I have illustrated another modification of my invention. The embodiment illustrated in these figures is generally similar to that of Figs. 1 and 2. In this modification, however, the filler elements 163 are provided with transverse recesses 160 in the inner ends thereof adjacent the knife edge bearing element 13 and adjacent the planar face 17 of the bolt element 11. These recesses are preferably rectangular in form, and inserts or sealing elements 161 are placed therein, compressingly filling the recess and preferably abutting at their opposite transverse ends, as at 162—162, Fig. 23, upon the inner wall of the bushing 7. Thus the mutually engaged planar faces of the bolt element 11 and filler elements 163 are effectively sealed against the ingress of abrasive substances or the egress of lubricant within the bushing when lubricant is employed.

Figures 24, 25:
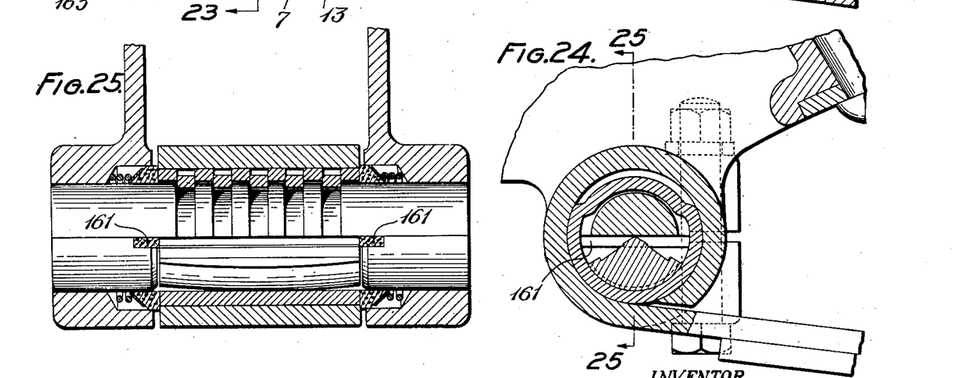
Fig. 24 is a view generally similar to Fig. 16 but illustrating a modification.
Fig. 25 is a view similar to Fig. 17 illustrating a modification, the view being taken along the line 25—25 of Fig. 24.

In Figs. 24 and 25 I have illustrated a modification of the embodiment of my invention illustrated in Figs. 16 and 17. In this modification, sealing elements or inserts 161 are employed in the same manner and for the purposes as those described above in connection with Figs. 22 and 23.

The inserts 161 are preferably formed from cork but obviously other materials may be used.

Although I have shown and described embodiments of my invention I contemplate that numerous and extensive departures may be made therefrom without departing from the spirit of my invention and the appended claims. Having thus described my invention, what I claim is:

1. The combination with a shackle hanger and the terminal eye of a leaf spring of a spring shackle mechanism comprising a pair of spaced parallel links each transversely apertured at its ends, the corresponding apertures of two links being in substantial alignment, bearing mechanisms interposed between each pair of alignedly apertured link ends comprising a tubular cage disposed in substantial alignment with one of said pairs of aligned apertures and a pair of cooperating bearing elements disposed within the cage, one of said bearing elements being interlocked with the cage to restrain longitudinal relative movements of said interlocked element and cage, but permitting relative rotational movements thereof, the other of said bearing elements being rotatively supported in the cage to permit relative rotational movement between it and said cage, one of said elements provided with a longitudinally extending bearing edge making a substantially straight line rocking bearing engagement only against a bearing surface of said other bearing element, approximately axially of said cage.

2. The combination substantially as set forth in claim 1, characterized by said cage and interlocked bearing element being relatively so formed that projections of the one are indentured with recesses of the other.

3. The combination substantially as set forth in claim 1, characterized by said edged bearing element being mounted within said cage and so formed relatively to the inner surface thereof, as to permit slight rocking movements in a general plane extending longitudinally and radially of said cage whereby to permit a full substantial line contact bearing engagement with the other bearing element.

4. The combination substantially as set forth in claim 1, characterized by said interlocked element provided with end extensions each projecting within a different one of a pair of said aligned apertures and fixedly secured to said link ends.

5. The combination substantially as set forth in claim 1, characterized by said interlocked element provided with end extensions each projecting within a different one of a pair of said aligned apertures and fixedly secured to said link ends, said extensions incompletely filling said apertures, and filler blocks disposed within said apertures together with said extensions.

6. A spring shackle mechanism for vehicles comprising a tubular bushing, longitudinally spaced inwardly directed portions of said bushing extending inwardly from a lateral wall thereof, a bearing element having longitudinally spaced grooves, telescoped into and extending within, indentured with, and slidable within said grooves, a second bearing element having a narrow bearing edge and a base portion which is engaged with said bushing, and making rocking contact along a longitudinal surface of said first element approximately at the axis of said bushing, and two supporting means joined with projecting ends of one of said bearing means outside of said bushing for connecting the same to a vehicle part, said bushing being exteriorly embraced by another vehicle part, said parts being hingedly interconnected by said mechanism.

7. The combination substantially as set forth in claim 5, characterized by the provision of sealing means at the ends of said bushing to restrain the ingress of dirt and moisture.

8. The combination substantially as set forth in claim 6, characterized by said projections being substantially arcuate in form and comprising integral bodily offset portions of said bushing walls.

9. A bearing mechanism comprising a load supporting tube and a pair of parallel bearing elements within the tube, one having portions projecting beyond the ends of the tube, said bearing elements making only a substantially straight line engagement at approximately the axis of the tube, and said elements being relatively rotatable about said line of contact, one of said elements engaged with an inner wall of said tube only by a medial portion whereby it may rock about its point of engagement to insure self-seating line contact engagement with the other element for the full length of the bearing.

10. In a knife edge bearing, the combination of a pair of bearing elements one presenting a surface upon which an edge of the other may rock, said edge and surface being in engagement along a substantially straight line extending axially of the bearing, and means supporting said elements in bearing engagement comprising means to permit longitudinal rocking movement to effect engagement of the bearing elements along the entire line of bearing contact.

11. In a knife edge bearing, the combination of a pair of bearing elements surrounded by a load supporting tube one presenting a surface upon which an edge of the other may rock, said edge and surface being in engagement along a substantially straight line extending axially of the bearing, and means supporting said elements in bearing engagement comprising means to permit longitudinal rocking movement to effect engagement of the bearing elements along the entire line of bearing contact, one of said bearing elements having longitudinally spaced portions indentured with correspondingly spaced portions of said tube to restrain relative longitudinal movements of said tube and said elements.

12. In a knife edge bearing, the combination of a pair of bearing elements one presenting a surface against which an edge of the other may rock, said edge and surface being in engagement along a substantially straight line extending axially of the bearing, and means supporting said elements in bearing engagement comprising means to permit longitudinal rocking movement to effect engagement of the bearing elements along the entire line of bearing contact, said supporting means comprising a tube having longitudinally spaced portions indentured with one of said bearing elements to restrain relative longitudinal movements of said tube and said indentured element.

13. The combination substantially as set forth in claim 9, characterized by said tube having arcuate inwardly projected rib portions indentured with grooves of one of said elements.

14. A bearing mechanism comprising a load supporting tube and a pair of parallel bearing elements within the tube, one having portions projecting beyond the ends of the tube, said bearing elements making only a substantially straight line engagement at approximately the axis of the tube, and said elements being relatively rotatable about said line of contact, one of said elements engaged with an inner wall of said tube only by a medial portion whereby it may rock about its point of engagement to insure self-seating line contact engagement with the other element for the full legth of the bearing, the other element comprising means locking it with said tube against movements longitudinally of said tube.

15. In a knife edge bearing, the combination of a pair of bearing elements one presenting a surface upon which an edge of the other may rock, said edge and surface being in engagement along a substantially straight line extending axially of the bearing, and means supporting said elements in bearing engagement comprising means to permit longitudinal rocking movement to effect engagement of the bearing elements along the entire line of bearing contact, at least one of said elements being restrained from movement relative to said supporting means in a direction longitudinal of said line of bearing engagement.

16. In a bearing mechanism, the combination of a pair of elongated relatively parallel bearing elements surrounded by a load supporting tube, one having a relatively flattened bearing surface making a substantially line contact with a substantially edge portion of the other bearing element, whereby said bearing elements are relatively rotatable along the resulting line of bearing contact, said tube enclosing both said elements in such a position relative to each other and said tube that said line contact is had substantially at the axis of the tube, one of said elements extending beyond the ends of the tube to form load supporting portions, and having an intermediately disposed radially extending projection interlocked with an intermediate portion interiorly of the tube.

17. In a bearing mechanism, the combination of a pair of elongated relatively parallel bearing elements, surrounded by a load supporting tube, one having a relatively flattened bearing surface making a substantially line contact with a slightly rounded substantially edge portion of the other bearing element, whereby said bearing elements are relatively rotatable along the resulting line of bearing contact, said elements having elongated arcuate outer surfaces, which are generally co-axial with said tube axis, said tube enclosing both said elements in such a position relative to each other and said tube that said line contact is had substantially at the axis of the tube, at least one of said elements having its said outer surface longitudinally convexly curved.

18. In a bearing mechanism, the combination of a pair of elongated relatively parallel bearing elements surrounded by a load supporting tube, one having a relatively flattened bearing surface making a substantially line contact with a slightly rounded substantially edge portion of the other bearing element, whereby said bearing elements are relatively rotatable along the resulting line of bearing contact, said elements having elongated arcuate outer surfaces, which are generally co-axial with said tube axis, said tube enclosing both said elements in such a position relative to each other and said tube that said line contact is had substantially at the axis of the tube, at least one of said elements engaging the wall of the tube by only an intermediate portion, whereby it may rock on said intermediate portion, to compensate for misalignment of one of said bearing elements otherwise preventing maximum engagement between the elements along said line of contact.

19. In a bearing mechanism, the combination of a pair of elongated relatively parallel bearing elements, one having a relatively flattened bearing surface making a substantially line contact with a substantially edge portion of the other bearing element, whereby said bearing elements are relatively rotatable along the resulting line of bearing contact, a load transmitting tube enclosing both said elements in such a position relative to each other and said tube that said line contact is had substantially at the axis of the tube, one of said elements extending beyond the ends of the tube to form load supporting portions, said last named element provided with a plurality of spaced transversely extending grooves on its outer surface, said tube having a plurality of complementary spaced projections extending into said grooves to interlock said element and tube against relative longitudinal movements.

20. In a bearing mechanism, the combination of a pair of elongated relatively parallel bearing elements, one having a relatively flattened bearing surface making a substantially line contact with a substantially edged portion of the other bearing element whereby said bearing elements are relatively rotatable along the resulting line of bearing contact, a tube enclosing both said elements, one of said elements extending beyond the ends of the tube to form load supporting portions of partly cylindrical form, filler elements completing the cylindrical form thereof between which the edged bearing element is longitudinally disposed, annular sealing elements engaging the tube ends and the cylindrical part to seal the tube.

21. In a bearing mechanism, the combination of a pair of elongated relatively parallel bearing elements, one having a relatively flattened bearing surface making a substantially line contact with a substantially edged portion of the other bearing element whereby said bearing elements are relatively rotatable along the resulting line of bearing contact, a tube enclosing both said elements, one of said elements extending beyond the ends of the tube to form load supporting portions of partly cylindrical form, filler elements completing the cylindrical form thereof between which the edged bearing element is longitudinally disposed, annular sealing elements engaging the tube ends and the cylindrical part to seal the tube, and resilient means for maintaining the seal.

22. In a bearing mechanism, the combination of a pair of elongated relatively parallel bearing elements, one having a relatively flattened bearing surface making a substantially line contact with a substantially edged portion of the other bearing element whereby said bearing elements are relatively rotatable along the resulting line of bearing contact, a tube enclosing both said elements, one of said elements extending beyond the ends of the tube to form load supporting portions of partly cylindrical form, filler elements completing the cylindrical form thereof between which the edged bearing element is longitudinally disposed, annular sealing elements engaging the tube ends and the cylindrical part to seal the tube, and the filler elements engaging the edged element only on end portions of the latter adjacent its edge to frictionlessly restrain it from longitudinal movement in the tube.

23. In a bearing mechanism, the combination of a pair of elongated relatively parallel bearing elements, one having a relatively flattened bearing surface making a substantially line contact with a substantially edged portion of the other bearing element whereby said bearing elements are relatively rotatable along the resulting line of bearing contact, a tube enclosing both said elements, one of said elements extending beyond the ends of the tube and terminating in cylindrical load supporting portions.

24. In a bearing mechanism, the combination of a pair of elongated relatively parallel bearing elements, one having a relatively flattened bearing surface making a substantially line contact with a substantially edged portion of the other bearing element whereby said bearing elements are relatively rotatable along the resulting line of bearing contact, a load-transmitting tube enclosing both said elements in such a position relative to each other and said tube that said line contact is had substantially at the axis of the tube, one of said elements extending beyond the ends of the tube to form a load-supporting portion, one of said elements being rotatable in the tube whereby upon relatively great relative rotational movement of the elements and the consequent impact of a portion of one element upon the other, the rotatable element may be rotatably displaced in the tube.

25. In a bearing mechanism, the combination of a pair of elongated relatively parallel bearing elements, one having a relatively flattened bearing surface making a substantially line contact with a substantially edged portion of the other bearing element whereby said bearing elements are relatively rotatable along the resulting line of bearing contact, a load-transmitting tube enclosing both said elements in such a position relative to each other and said tube that said line contact is had substantially at the axis of the tube, one of said elements extending beyond the ends of the tube to form a load-supporting portion, one of said elements being rotatable in the tube whereby upon relatively great relative rotational movement of the elements and the consequent impact of a portion of one element upon the other, the rotatable element may be rotatably displaced in the tube, and the said edge portion being bluntly rounded whereby load upon the tube transmitted to the edged element from the flattened element may rotatably restore the displaced element.

26. In a bearing mechanism, the combination of a pair of elongated relatively parallel bearing elements, one having a relatively flattened bearing surface making a substantially line contact with a substantially edged portion of the other bearing element, whereby said bearing elements are relatively rotatable along the resulting line of bearing contact, a load-transmitting tube enclosing both said elements in such a position relative to each other and said tube that said line contact is had substantially at the axis of the tube, one of said elements extending beyond the ends of the tube to form load-supporting portions, one of said elements being recessed longitudinally in portions thereof between the line of edge contact and the tube wall to cause impact between the elements resulting from relatively great rotational movement which may occur on portions of the elements relatively radially remote from the said edge.

27. In a shackle bearing construction, a pair of shackle hangers having spaced pairs of aligned cylindrical eyes, a pair of parallel bearing elements each having cylindrical portions secured in the eyes, against longitudinal and rotational movement, and each having a flattened substantially planar bearing surface substantially coincident with the cylindrical axis, and disposed between the eyes, a knife edge bearing element having a substantially knife edge portion rockingly engaging the flattened surface, a tube surrounding both said bearing elements and engaging the knife edge element on a generally cylindrical portion opposite its edge to transmit load to and from the knife edge elements.

28. In combination with the eye of a leaf spring, a bearing mechanism therefor comprising in a knife edge bearing, the combination of a pair of bearing elements one presenting a surface against which an edge of the other may rock, said edge and surface being in engagement along a substantially straight line extending axially of the bearing, and means supporting said elements in bearing engagement comprising means to permit longitudinal rocking movement to effect engagement of the bearing elements along the entire line of bearing contact.

29. In combination with the eye of a leaf spring, a bearing mechanism therefor comprising in a knife edge bearing, the combination of a pair of bearing elements one presenting a surface against which an edge of the other may rock, said edge and surface being in engagement along a substantially straight line extending axially of the bearing, and means supporting said elements in bearing engagement comprising means to permit longitudinal relative rocking movement to effect engagement of the bearing elements along the entire line of bearing contact, and a bushing disposed within said spring eye, one of the elements comprising a pin projected through said bushing, and the other being disposed between an intermediate portion of the pin and said bushing.

30. In combination with the eye of a leaf spring, a bearing mechanism therefor comprising in a knife edge bearing, the combination of a pair of bearing elements one presenting a surface upon which an edge of the other may rock, said edge and surface being in engagement along a substantially straight line extending axially of the bearing, and means supporting said elements in bearing engagement comprising means to permit longitudinal relative rocking movement to effect engagement of the bearing elements along the entire line of bearing contact, and a bushing disposed within said spring eye one of the elements comprising a pin projected through said bushing, and the other being disposed between an intermediate portion of the pin and said bushing, and means comprising indentured rib and groove elements of said bushing and pin to restrain relative longitudinal movements thereof.

31. In combination with the eye of a leaf spring, a bearing mechanism therefor comprising in a knife edge bearing, the combination of a pair of bearing elements one presenting a surface against which an edge of the other may rock, said edge and surface being in engagement along a substantially straight line extending axially of the bearing, and means supporting said elements in bearing engagement comprising means to permit longitudinal relative rocking movement to effect engagement of the bearing elements along the entire line of bearing contact, and a bushing disposed within said spring eye one of the elements comprising a pin projected through said bushing, and the other being disposed between an intermediate portion of the pin and said bushing, and means comprising indentured rib and groove elements of said bushing and pin to restrain relative longitudinal movements thereof, and packing means at the end of said bushing surrounding said pin to seal the interior of the bearing.

32. In a knife edge bearing mechanism, the combination of a pair of bearing elements, one having a straight edge, and the elements having lateral relative rocking bearing contact at said edge along substantially the axis of the bearing, a load transmitting element provided with a generally cylindrical bore surrounding the bearing elements, one of the elements projecting from opposite ends of the bore and having cylindrical end portions externally thereof, and a second load transmitting element secured to the cylindrical portions.

33. A knife edge bearing mechanism as described in claim 32 and characterized by the provision of means to seal the cylindrical end portions with respect to the bore.

34. A knife edge bearing mechanism as described in claim 32 characterized by the provision of means to seal the cylindrical end portions upon portions of the load transmitting elements adjacent ends of the bore.

35. A knife edge bearing mechanism as described in claim 32 and in which at least one of the cylindrical end portions comprises a part cylindrical portion of the projecting element and a part cylindrical element mutually engaged on axially extending surfaces.

36. A knife edge bearing mechanism as described in claim 32 and in which at least one of the cylindrical end portions comprises a part cylindrical portion of the projecting element and a part cylindrical element mutually engaged on axially extending substantially coaxial planar surfaces.

37. A knife edge bearing mechanism as described in claim 32 and in which at least one of the cylindrical end portions comprises a part cylindrical portion of the projecting element and a part cylindrical element mutually engaged on axially extending surfaces and sealing means is provided to seal the surfaces against the escape therebetween of lubricant supplied to the interior of the bore.

38. A knife edge bearing mechanism as described in claim 32 and in which the straight edged element abuts at its opposite axial end portions upon transverse portions of the other element to position it axially relative thereto.

39. A knife edge bearing mechanism as described in claim 32 and in which axially opposite end portions of the straight edged element abut upon inwardly facing surface portions of the said cylindrical end portions to position it relative to the other element.

40. A knife edge bearing mechanism as described in claim 32 and in which the elements are interlocked with the bored load transmitting element to prevent axial displacement relative thereto.

41. A knife edge bearing mechanism as described in claim 32 and in which the element which projects from the bore is interlocked with the bored load transmitting element and the edged element is interlocked with the other bearing element to prevent axial displacement of the element relative to the bore.

42. A knife edge bearing mechanism as described in claim 32 and in which the element which projects from the bore is interlocked with the bored load transmitting element by meshed parti-circular tongues and grooves on the element and on the wall of the bore to prevent axial displacement of the said element relative to the bore.

43. A knife edge bearing mechanism as described in claim 32 and in which the straight edged bearing element contacts the other bearing element on a substantially planar coaxial surface thereof.

44. A knife edge bearing mechanism as described in claim 32 and in which the straight edged bearing element contacts the other bearing element by its edge at the apex of a longitudinally extending transversely generally V-shaped groove portion.

45. A knife edge bearing mechanism as described in claim 32 and in which the bearing elements are movable rockingly longitudinally in the said bore to insure self-seating line contact engagement between the two elements for the full length of the bearing edge.

46. A knife edge bearing mechanism as described in claim 32 and in which the edge bearing element is formed to rock longitudinally on the bore wall to insure self-seating line contact engagement between the two elements for the full length of the bearing edge.

47. A knife edge bearing mechanism as described in claim 32 and in which the edged element is generally of sector shape in transverse section, providing lubricant chambers on each side thereof, and passageways are provided at at least one end of the element to permit lubricant to flow freely from one side of the element to the other upon relative rocking movement of the two elements.

48. In a knife edge bearing mechanism, the combination of a pair of bearing elements, one having a straight edge, and the elements having lateral relative rocking bearing contact at said edge along substantially the axis of the bearing, a load transmitting element provided with a generally cylindrical bore surrounding the bearing elements, one of the elements having end portions projecting from opposite ends of the bore, and a second load transmitting element secured to the projecting end portions.

49. A knife edge bearing mechanism as described in claim 48 and in which the straight edged element abuts at its opposite axial end portions upon transverse portions of the other element to position it axially relative thereto.

50. A knife edge bearing mechanism as described in claim 48 and in which axial end portions of the straight edged element abut upon inwardly facing surface portions of the projecting end portions to position it relative to the other element.

51. A knife edge bearing mechanism as described in claim 48 and in which the bearing elements are interlocked with the bored load transmitting element to prevent axial displacement relative thereto.

52. A knife edge bearing mechanism as described in claim 48 and in which the element projecting from the bore is interlocked with the bored load transmitting element and the edged element is interlocked with the said projecting element to prevent axial displacement of the elements relative to the bore.

53. A knife edge bearing mechanism as described in claim 48 and in which the element which projects from the bore is interlocked with the load transmitting element by meshed parti-circular tongues and grooves on the element and inner wall of the bore to prevent relative axial displacement thereof relative to the bore.

54. A knife edge bearing mechanism as described in claim 48 and in which the straight edged bearing element contacts the other bearing element by its edge at the apex of a longitudinally extending transversely generally V-shaped groove portion.

55. A knife edge bearing mechanism as described in claim 48 and in which the said straight edge of the edged element is on a separate hardened element supported by the edged element.

56. A knife edge bearing mechanism as described in claim 48 and in which the bearing elements are movable rockingly longitudinally in the said bore to insure self-seating line contact engagement between the two elements for the full length of the bearing edge.

57. A knife edge bearing mechanism as described in claim 48 and in which the edged bearing element is formed to rock longitudinally on the bore wall to insure self-seating line contact engagement between the two elements for the full length of the bearing edge.

58. A knife edge bearing mechanism as described in claim 48 and in which the edged element is generally of sector shape in transverse section, providing lubricant chambers on each side thereof and providing passageways at at least one end of the element to permit lubricant to flow freely from one end of the element to the other upon relative rocking movement of the two elements.

OSCAR U. ZERK.